Inventor
Leon Perry,

Feb. 17, 1942.　　　　L. PERRY　　　　2,273,496
BOOSTER FOR FRICTION CONTROLS OR CLUTCHES
Filed June 6, 1941　　　3 Sheets-Sheet 3

Inventor
Leon Perry,

By McMorrow & Berman
Attorneys

Patented Feb. 17, 1942

2,273,496

UNITED STATES PATENT OFFICE 2,273,496

BOOSTER FOR FRICTION CONTROLS OR CLUTCHES

Leon Perry, Brooklyn, N. Y.

Application June 6, 1941, Serial No. 396,917

6 Claims. (Cl. 192—35)

This invention relates to a friction control or clutch especially adapted for winches employed on power operated shovels, cranes or like machinery and more particularly to a booster used in conjunction with the hand operated means for the control of the friction drive means to assure positive action between said friction drive means and the drum of the winch when under varying loads and automatically increases its action on the friction drive means as the load increases regardless of whether the drive means is in motion or comes to a standstill.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation, partly in vertical section illustrating a friction control or clutch and constructed in accordance with my invention.

Figure 1:
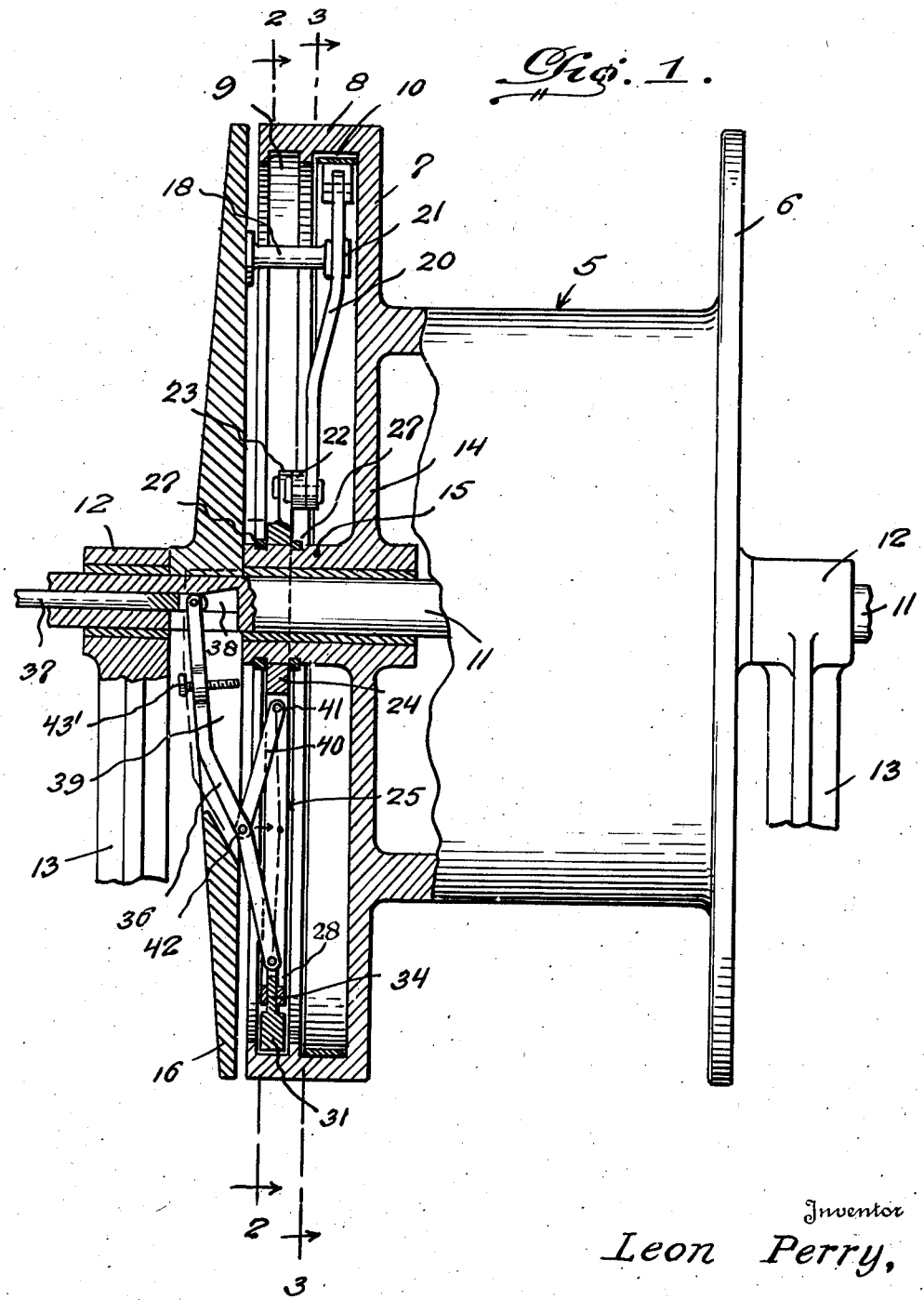

Referring in detail to the drawings, the numeral 5 indicates a drum of a winch or other similar type of machinery employed on a power operated shovel, crane or the like. The drum 5 includes the usual side flanges 6 and 7 between which a cable of the winch operates. The flange 7 is shaped to provide a clutch drum 8 having spaced internal annular grooves or channels 9 and 10.

The drum 5 of the winch is rotatably supported on a power shaft 11 journaled in bearings 12 of a supporting structure 13.

Integral with the end wall 14 of the drum 5 is a hub 15 aiding in the support of the drum 5 on the shaft 11 and also acting as a bearing for a part of the mechanism of the present invention.

A drive disc 16 is secured to the drive shaft 11 and faces the clutch drum 8. Clutch band pins 17 and 18 are secured to the drive disc 16 and project into the clutch drum 8. One end of a clutch band 19 of the split type is pivoted on the pin 17 while the opposite end of said clutch band is pivotally connected to the short end of a lever 20. The lever 20 is pivoted on the pin 18, as shown at 21, and its free end is pivotally connected to a link 22 which is in turn pivoted to an ear 23 formed on a bearing 24 that forms a part of a booster 25. The clutch band operates within the channel 10 while the booster 25 operates within the channel 9 so that either of said parts will not interfere with each other during their different stages of operation.

The bearing 24 is of the adjustable cap type, the adjustment being attained through the use of shims 26 to compensate for wear. The bearing 24 is journaled upon the hub 15 between rings 27 fitted in grooves provided in the hub 15. The arm of the booster is indicated by the character 28 and forms an integral part of one section of the bearing 24 and terminates in a head 29 provided with spaced openings to slidably receive pins 30 of a shoe 31.

Coil springs 32 are mounted on the pins between the heads 33 and the head 29 of the arm 28 to yieldably secure the shoe 31 to the head of the arm. The heads 33 are preferably in the form of nuts threaded onto the pins 30 to permit the shoe to be easily assembled on the arm 28.

A lug 34 of the bifurcated type is formed on the shoe and is slidably received in a slot 35 extending through the head 29 and the major portion of the arm 28 of the booster 25 and has pivotally connected thereto one end of a lever 36, the other end of which is pivotally connected to an operating shaft 37 slidably mounted in a bore 38 provided in the power shaft 11 and is rotatable with the latter.

It is to be understood that endwise movement of the operating shaft 37 may be had manually in any well known manner. The lever 36 has a curvature thereto so that a portion of said lever operates within a slot 39 provided in the drive disc 16. Supporting links 40 are pivoted in the slot 35 to the arm 28 of the booster, as shown at 41, and also are pivotally connected to the lever 36, as shown at 42. Said curvature of the lever 36 permits the extending and retraction of the shoe with relation to the wall of the groove or channel 9 of the clutch drum by the opposite sliding movement of the operating shaft 37.

When the clutch shoe is brought in engagement with the clutch drum by the sliding movement of the operating shaft 37 in one direction the pivot 42 moves into the dotted line position shown in Figure 1 which positions said pivot slightly to the opposite side of a dead center position with respect to the pivot 41 from that normally occupied, as shown in full line in Figure 1, for the purpose of assuring a tight frictional grip of the shoe 31 with the periphery of the clutch drum 8.

Figure 2:
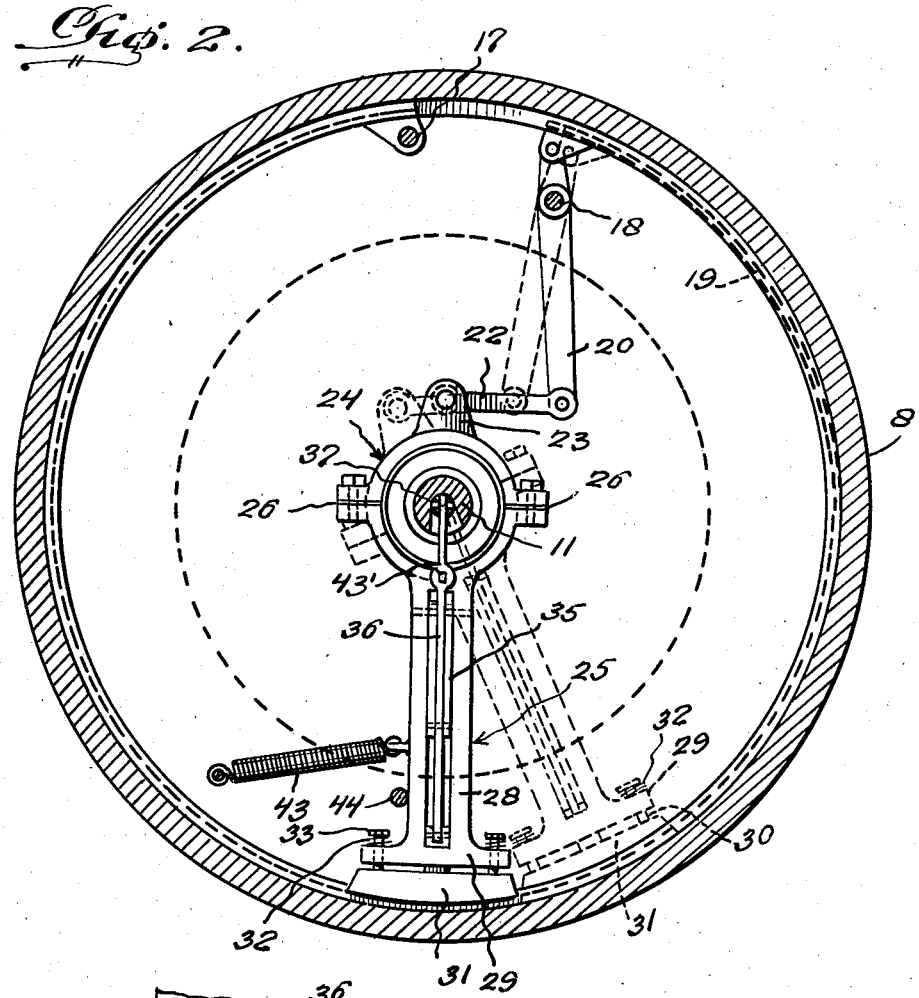
Figure 2 is a transverse sectional view taken on the line 2—2 of Figure 1.
Figure 4:
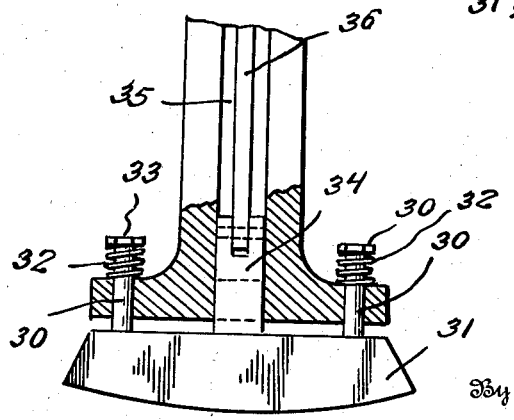
Figure 4 is an enlarged fragmentary sectional view illustrating a portion of the booster arm and the yieldable shoe carried thereby.
Figure 3:
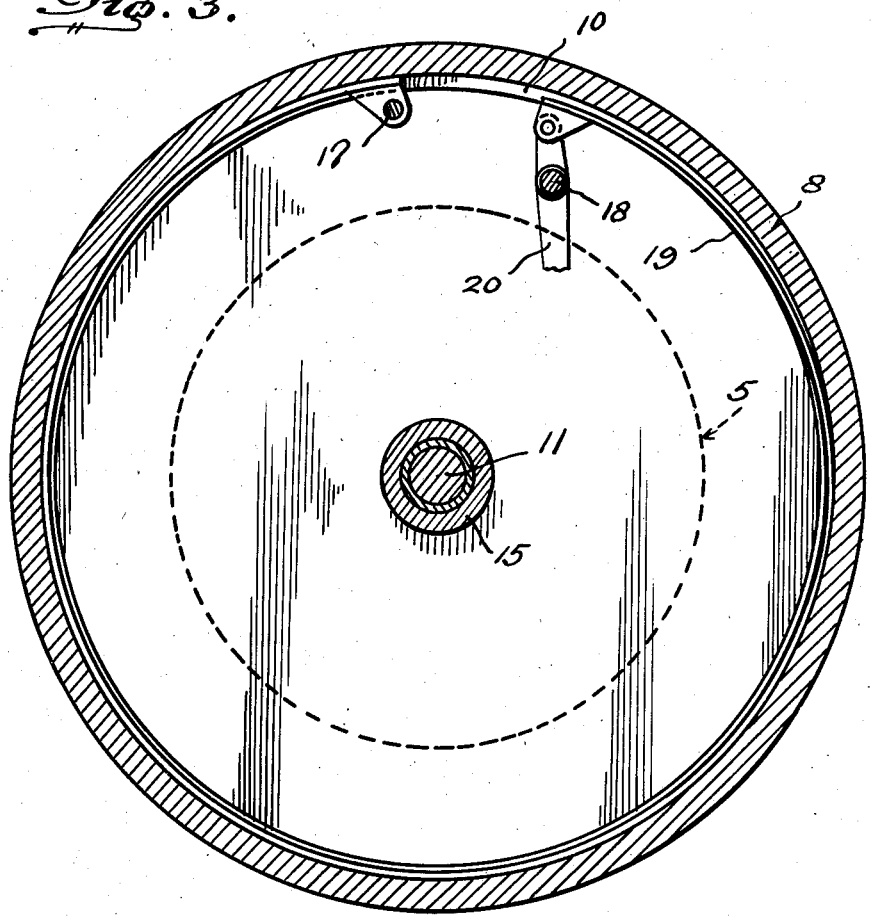
Figure 3 is a transverse sectional view taken on the line 3—3 of Figure 1.
Figure 5:
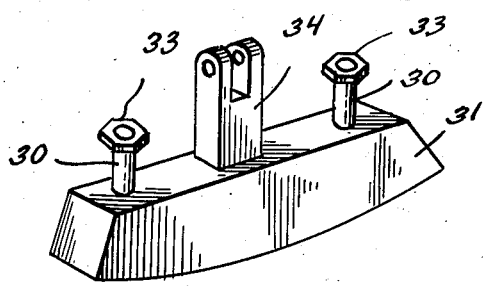
Figure 5 is a perspective view illustrating the booster shoe.

A coil spring 43 is connected to the arm 28 of the booster 25 and to the drive disc 16 and normally urges the arm 28 in engagement with a stop pin 44 provided on the drive disc. When the arm 28 is in engagement with the stop pin 44, the shoe 31 is disengaged from the clutch drum 8 relieving the clutch band 19 of any action thereon consequently permitting the drum 5 of the winch to turn free relative to the drive disc 16. The rotation of the drive disc and the drum 5 is in the direction indicated by the arrows in Figure 2 so that when the operating rod 37 is moved in the direction indicated by the arrow in Figure 1, the clutch shoe 31 will be caused to move into frictional engagement with the clutch drum 8 and assume a position as shown in dotted lines in Figure 2 and with a tight wedging action with the clutch drum. When in the dotted line position as shown in Figure 2 the arm 28 will have caused pivotal movement of the lever 20 applying the clutch band tightly against the clutch drum 8 consequently establishing an efficient frictional drive between the drive disc and the drum 5 of the winch free of slippage.

As soon as the shoe 31 moves into engagement with the drum 8 a drag is placed on the arm 28 in a direction opposite to the direction of rotation of the drum 8. This drag upon the shoe causes the arm 28 to rock on its bearing and assume the dotted line position as shown in Figure 2, bringing about a tight applying of the clutch band on the drum 8.

With the clutch band applied to the clutch drum 8 by the booster 25 all slippage between the drive shaft and the drum 5 of the winch will be prevented and as the load increases on the drum 5 the greater the booster will act in applying the clutch band to the drum 8.

The spring 43 assists in returning the booster 25 to its initial position, that is, with the arm 28 thereof in engagement with the stop pin 44 when the operating shaft 37 is moved or slid in a direction reverse to that indicated by the arrow in Figure 1.

A set screw 43' is carried by the lever 36, the purpose of which is to vary the distance in which the pivot 42 may move beyond a dead center position as heretofore described.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the class described, a power shaft, a winch drum to be driven by said power shaft, friction means driven by said shaft to engage and disengage with the drum and including linkage, a booster connected with said linkage and mounted for rotation on the winch drum with its axis of rotation coinciding with the axis of rotation of the shaft and including a movable shoe, and a hand operated means connected to the shoe for the engagement and disengagement thereof with the winch drum.

2. In a device of the class described, a rotatably supported power shaft, a drum journaled on said shaft, a drive disc secured to said shaft, a clutch band for said drum, linkage for the engagement and disengagement of the band with the drum and carried by the drive disc, a booster arm connected to said linkage and journaled on the drum and including a movable yieldably mounted shoe to engage and disengage with the drum, and a hand operated means connected to the shoe for the engagement and disengagement thereof with the drum.

3. In a device of the class described, a rotatably supported power shaft, a drum journaled on said shaft, a drive disc secured to said shaft, a clutch band for said drum, linkage for the engagement and disengagement of the band with the drum and carried by the drive disc, a booster arm connected to said linkage and journaled on the drum and including a movable yieldably mounted shoe to engage and disengage with the drum, supporting links pivoted to said booster, a lever pivoted to said links and to the shoe, and a slidable operating rod connected to said lever for the engagement and disengagement of the shoe with the drum.

4. In a device of the class described, a rotatably supported power shaft, a winch drum journaled on said shaft, a clutch drum formed on said winch drum, a drive disc secured to the shaft and opposing the clutch drum, a split type clutch band having one end pivoted to said disc, a lever pivoted on said disc and having the other end of the band pivoted thereto, a hub on the winch drum within the clutch drum, an arm journaled on said hub, a link connecting said arm to said lever, a spring influenced shoe slidably mounted on said arm to be engaged and disengaged with the clutch drum for the engagement and disengagement of the band with the clutch drum, and a hand operated means connected to the shoe for the engagement and disengagement thereof with the clutch drum.

5. In a device of the class described, a rotatably supported power shaft, a winch drum journaled on said shaft, a clutch drum formed on said winch drum, a drive disc secured to the shaft and opposing the clutch drum, a split type clutch band having one end pivoted to said disc, a lever pivoted on said disc and having the other end of the band pivoted thereto, a hub on the winch drum within the clutch drum, an arm journaled on said hub, a link connecting said arm to said lever, a spring influenced shoe slidably mounted on said arm to be engaged and disengaged with the clutch drum for the engagement and disengagement of the band with the clutch drum, links pivoted to said arm, a second lever pivoted to said links and to said shoe, and a hand operated means connected to the second lever for engaging and disengaging the shoe with the clutch drum.

6. In a device of the class described, a winch drum, a clutch element fixed to the drum, a power shaft for rotating the drum, a second clutch element movable to coact with the first-named clutch element for establishing a drive between the shaft and the drum, a booster member journaled on the drum and connected to said second mentioned clutch element to clutch and declutch the latter with the first named clutch element and including a shoe movable into and out of engagement with the first named clutch element and when engaged with the latter actuates the second clutch element to clutch with the first named clutch element by the relative movement between the drum and the shaft, and manual means for engaging and disengaging the shoe with the first mentioned clutch element.

LEON PERRY.